United States Patent [19]

Kishimoto

[11] Patent Number: 4,750,787
[45] Date of Patent: Jun. 14, 1988

[54] RELAY VALVE FOR AN AIR BRAKE SYSTEM

[75] Inventor: Takeshi Kishimoto, Kobe, Japan

[73] Assignee: Nippon Air Brake Co., Ltd., Kobe, Japan

[21] Appl. No.: 919,726

[22] Filed: Oct. 16, 1986

[30] Foreign Application Priority Data

Oct. 25, 1985 [JP] Japan .......................... 60-164642[U]

[51] Int. Cl.$^4$ ............................................. B60T 15/18
[52] U.S. Cl. ........................................ 303/40; 303/54
[58] Field of Search ................ 303/7, 29, 40, 52, 54

[56] References Cited

U.S. PATENT DOCUMENTS 2,985,490  5/1961  Gates ..................................... 303/40

Primary Examiner—Duane A. Reger
Attorney, Agent, or Firm—J. B. Sotak

[57] ABSTRACT

A relay valve for use with a railroad car braking system includes a housing in which a control chamber is disposed between a delivery chamber on an upper side and an exhaust chamber on a lower side. A supply chamber is disposed above the delivery chamber. A control piston disposed in the control chamber is reciprocally-movable as a function of the balance of forces acting on opposing sides of the piston. In order to achieve the desired balance of control fluid pressure to delivery fluid pressure, the surface areas of the piston on which these pressures are exerted are equalized by way of a hollow rod extension coaxially-disposed on the piston, and extending from the lower exhaust chamber to the upper delivery chamber. A supply valve between the supply chamber and delivery chamber and an exhaust valve connected between the delivery chamber and exhaust chamber by the hollow rod member are arranged in a stacked manner, and are operated to the necessary opening and closing sequence by movement of the piston under the influence of the control fluid pressure.

14 Claims, 1 Drawing Sheet

RELAY VALVE FOR AN AIR BRAKE SYSTEM

BACKGROUND OF THE INVENTION

This invention relates to a relay-type valve, especially as used on the air brake system of a railroad car. Such relay valves, typically called reduction relay valves, are used on railroad cars of length of 75 feet or greater, and are effective to insure that a reduction of brake pipe pressure in a longer car occurs at essentially the same time as this reduction occurs on cars of a short length, as for instance, 40 to 50 feet. A typical relay valve presently in use, utilizes a control pressure to move a piston member which has a rod portion formed thereon, this rod portion being effective to operate a supply valve and an exhaust valve which are arranged in a stacked manner. It is the purpose of such a relay valve to operate this valve arrangement to provide delivery of fluid pressure from a supply, such as the railroad car's main reservoir, at the exact level as the control fluid pressure and to exhaust brake pipe pressure in sequence with all other car brake units. However, a typical relay valve has not been able to maintain such a relationship, due particularly to the fact that the surface area of the piston area subjected to the control pressure on one hand, differs from the surface area of the piston subject to the delivery fluid pressure on the other hand. This difference in effective surface areas has resulting an an imbalance of the piston, wherein one pressure is greater than the other. Such a typical relay valve is disclosed in the Japanese Pat. No. 44-27163, and will be discussed hereinafter in further detail.

SUMMARY OF THE INVENTION

It is, therefore, an object of the invention to provide a relay valve for use on a fluid-pressure-operated brake system for a railroad car which provides a timely brake pipe pressure-reduction, regardless of the length of the railroad car.

It is a further object of the invention to provide such a relay valve which includes a piston member having two substantially equivalent, opposing surface areas, one of which is exposed to a control fluid pressure while the other is exposed to the delivery fluid pressure.

Yet a further object of the invention is to provide such a relay valve which includes a hollow rod portion coaxially-extending from the piston, which penetrates the partition between a control chamber and exhaust chamber in a sliding, sealed manner.

An even further object of the invention is to provide such a relay valve which includes an exhaust valve and a supply valve arranged in a stacked manner, and wherein the exhaust valve allows fluid communication between a delivery chamber and an exhaust chamber through the hollow rod portion.

Still another object of the invention is to provide such a relay valve which includes a biasing spring with a small spring constant which acts on the one side of the piston such that the piston is urged toward the control chamber.

Briefly, the invention consists of a valve housing having a control chamber formed therein with an exhaust chamber formed below the control chamber, and a delivery chamber disposed above. A piston disposed within the control chamber is movable under the influence of control fluid pressure on one side, and delivery fluid pressure on the other side. A hollow rod portion is coaxially-formed on the piston and extends from the exhaust chamber through the delivery chamber. An exhaust valve, formed partially on the hollow rod, is controlled by movement of the piston and, when opened, allows fluid pressure from the delivery chamber (which is in fluid communication with the brake pipe) to flow through the hollow rod to be exhausted through the exhaust chamber. A supply valve is disposed in a stacked relation to the exhaust valve and is also controlled by the hollow rod, to open and supply fluid pressure to the brake pipe. With the exhaust chamber disposed below the control chamber, the surface area of the two sides of the piston, which are exposed to the control fluid pressure on one hand and the delivery fluid pressure on the other hand, can be made substantially equivalent such that, the fluid pressure value of the control fluid pressure will most closely reflect the fluid pressure delivered to the brake pipe.

DESCRIPTION AND OPERATION

Figure 2:
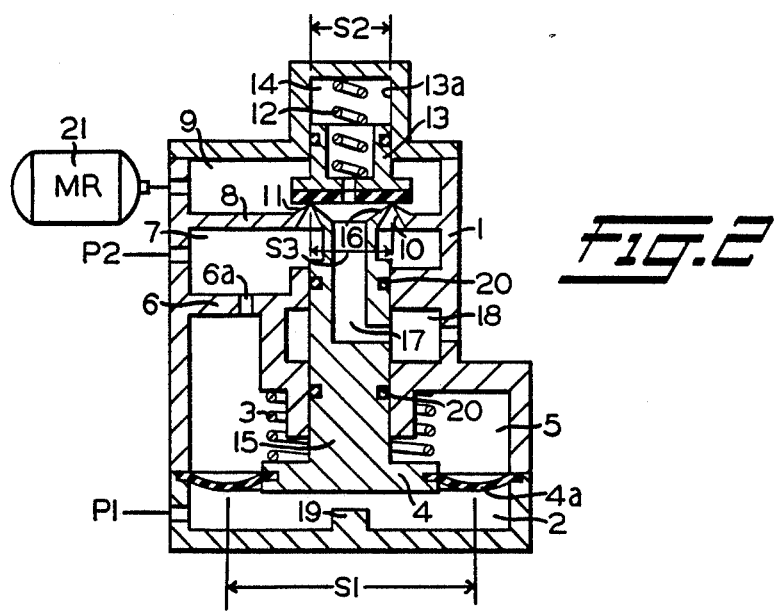
FIG. 2 is an elevational view, in section, of a relay valve constructed in accordance with the prior art.

In order to better understand the invention, a discussion of the relay valve of the prior art, as shown in FIG. 2, will first be offered.

In FIG. 2, 1 is the main body; and inside the main body 1 there are the control chamber 2, the equalization chamber 5, the delivery chamber 7, the supply chamber 9, and the exhaust chamber 18. One side (the bottom side in the Figure) of the piston 4 with a diaphragm plate 4a, faces the control chamber 2, into which the control fluid pressure P1 is supplied and exhausted. The piston 4 is energized in the direction of the control chamber 2 by the weak return spring 3. The equalization chamber 5 faces the other side (upper side in the Figure) of the piston 4 and connects openly to the delivery chamber 7 via throttle 6a, which is boted in the first partition 6, one side of which faces the other side of the piston 4. The delivery chamber 7 connects openly to the supply chamber 9 via the supply opening 10, bored in the second partition 8, one side of which faces the other side of the first partition 6. This supply chamber 9 connects to the compressed air source MR 21.

The supply valve seat 11 projects around the opening end of the abovementioned supply opening 10 in the supply chamber 9 side. The hollow supply valve body 13, which attaches to or detaches from the supply valve seat 11, is provided in the supply chamber side 9, and is energized by the weak valve spring 12. The rear portion 13a of the supply valve 13 fits into the rear chamber 14 in such a way that it can slide freely, and the cross-sectional area S2 of this rear chamber 14 is almost the same as the effective area of the abovementioned supply valve seat 11. The supply-exhaust valve rod 15 is provided on the equalization chamber 5 side of the piston 4 as one piece, and it penetrates the first partition 6 in such a way that it can slide freely and in a sealed manner, and its tip (the upper end part in the Figure) protrudes to the delivery chamber 7. There is an exhaust valve seat 16, formed on the tip of this supply-exhaust valve rod 15, and which faces the front surface (the lower surface in the Figure) of the supply valve 13. The effective area S3 of the exhaust valve seat 16 is almost the same as the effective area of the abovementioned supply valve seat 11, and it is designed to be slightly smaller. The exhaust opening 17, one end of which opens inside the abovementioned exhaust valve seat 16, is bored inside the supply-exhaust valve rod 15; and the other end of this exhaust opening 17 opens to the exhaust chamber 18, which is formed inside the first partition 6, and which is open to the atmosphere. In FIG. 2, S1 is the effective area of the piston 4 with the diaphragm plate 4a, and P2 is the output fluid pressure which is supplied to the brake cylinder, etc., which is outside the Figure and not shown. 19 is the stopper and 20 is the seal element.

FIG. 2 illustrates the stacked arrangement in which the supply valve 13 (on the front of which the exhaust valve seat 16 is seated) sits on the supply valve seat 11, and the connection between the supply chamber 9 and the delivery chamber 7 is shut OFF and, at the same time, one end of the exhaust opening 17 is closed. At this time, the active force of the output fluid pressure P2 and the return spring 3 to the piston 4, balances with the active force of the control fluid pressure P1 to the piston 4. In other words, $P2 \times (S1-S3) + F = P1 \times S1$. Here, F is the small added power of the return spring.

In this stacked state, when the control fluid pressure P1 becomes low, the equalization of the forces acting on the piston 4 is eliminated, and the piston 4 moves toward the control chamber 2 and, accompanying this, the exhaust valve seat 16 separates from the supply valve 13 and the exhaust opening 17 opens, so that the output fluid pressure P2 becomes low. When the output fluid pressure P2 reaches the value at which the abovementioned equation can be satisfied, the exhaust valve seat 16 is reseated on the supply valve 13, and it returns to the stacked state again. Furthermore, when the control chamber 2 is completely exhausted, the piston 4 moves until it contacts the stopper 19, under the action of the return spring 3, and the delivery chamber 7 is exhausted to the atmosphere via exhaust opening 17. In the abovementioned stacked state, when the control fluid pressure P1 increases, the equalization of forces which acts on the piston 4 is broken and the piston 4 moves toward the equalization chamber 5 side; and the supply valve 13, on which the exhaust valve seat 16 is still seated, is pushed upward in the Figure by the supply-exhaust valve rod 15 and separates from the supply valve seat 11, and the supply opening 10 is opened, so that the supply chamber 9 connects openly to the delivery chamber 7 and the output fluid pressure P2 rises. Accompanying this, the piston 4 moves toward the control chamber 2; and when the output fluid pressure P2 reaches a value which satisfies the abovementioned equation, the supply valve 13 seats on the supply valve seat 11 again and the stacked position is re-attained. Additionally, in the abovementioned stacked position, the forces acting on the front and back surfaces of the suypply valve 13 are almost balanced.

As previously discussed, the function of the relay valve in a railroad brake application is the amplification of the supply-exhaust capability, so that the output fluid pressure P2 is desired to be the same as the control fluid pressure P1. However, as can be understood from the equalization equation in the stacked state:

$$P2 \times (S1-S3) + F = P1 \times S1$$

the relay valve of the prior art, as shown in FIG. 2, has the disadvantage that the output fluid pressure P2 becomes higher than the control fluid pressure P1. The cause of this problem is the fact that in the stacked state, the surface area (S1−S3), on which the output fluid pressure P2 is exerted on the piston 4, is smaller than the area S1 on which the control fluid pressure P1 is exerted on the piston 4. The difference (S3) of the respective surface areas receiving the fluid pressure is the effective area of the abovementioned exhaust valve seat 16.

Figure 1:
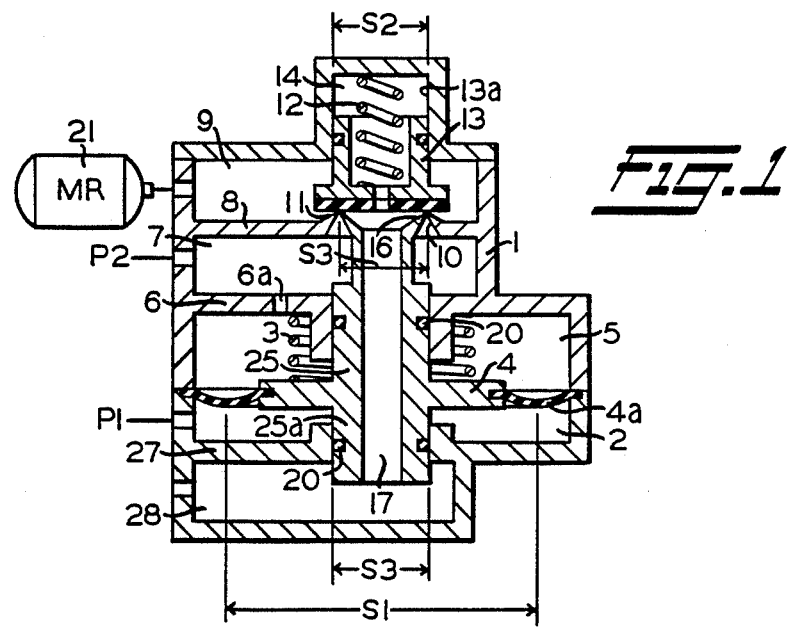
FIG. 1 is an elevational view, in section, of a relay valve constructed in accordance with the invention.

In contrast, the relay valve device shown in FIG. 1 does provide a substantially equivalent surface area on each side of the piston 4, and will now be described utilizing the same reference terminology for the elements that are the same as that shown in FIG. 1. As shown in FIG. 1, the type and number of chambers are the same as in FIG. 2; however, the orientation is changed. In FIG.1, there is an exhuast chamber 28, which is located beneath the control chamber 2 and is separated therefrom by a third partition 27. The supply chamber 9 and the delivery chamber 7 occupy the same relative positions in FIG. 1 as in FIG. 2, and they also function in the same manner as previously discussed.

The supply-exhaust valve rod 25 has an extension 25a, which extends from the control chamber side of the piston 4, through a rod opening 26 formed in the third partition 27, and into the exhaust chamber 28. The extension 25a penetrates the third partition 27 in such a way that it can slide freely and in an airtight manner, and wherein the bottom-most portion has the exhaust opening 17 always facing the exhaust chamber 28. The cross-sectional area of the abovementioned rod extension 25a is substantially the same (S3) as the effective area of the exhaust valve seat 16. Therefore, the area in which the control fluid pressure P1 and the output fluid pressure P2 act on the piston 4 are both S1−S3.

The operation of the relay valve (shown in FIG. 1) will first be described uner a condition where it is desired to reduce the amount of brake pipe pressure in the brake pipe (not shown). To accomplish this, the supply valve 13 is put into a closed condition under the influence of valve spring 12, and it remains in this condition since the supply-exhaust valve rod 25 will be heading in the downward direction as shown in the Figure. The downward movement of the supply-exhaust valve rod 25 is a result of a reduction of the control fluid pressure P1 in the control chamber 2, which allows the downward movement of the piston 4 under the influence of the return spring 3. When the supply-exhaust valve rod 25 has moved sufficiently downward, the exhaust valve seat 16 formed at the upper opening of the supply-exhaust valve rod 25, comes away from the supply valve body 13 such that, output fluid pressure P2 present in the delivery chamber 7 can flow through the hollow region of the supply exhaust valve rod 25. In this manner, it can be appreciated that with the exhaust chamber 28 adjoining the control chamber 2 at a point below the control chamber 2 and being separated by the third partition 27, and with the supply-exhaust valve rod 25 extending in such a way that its cross-sectional area is substantially the same as the effective area of the exhaust valve seat 16, the area in which the output fluid pressure P2 acts on the piston 4 and the area in which the control fluid pressure P1 acts on the piston 4 become almost equal. Specifically, the equalization equation becomes: $P2 \times (S1-S3) + F = P1 \times (S1-S3)$, and the output fluid pressure P2 becomes substantially the same value as the control fluid pressure P1 since the additional force of the return spring 3 is so small.

If it is desired to replenish the brake pipe pressure, the control fluid pressure P1 is increased and the piston 4 is urged upward (as shown in the Figure), against the force of the return spring 3. The supply-exhaust valve rod 25 will act against the surface of the supply valve body 13, closing the exhaust valve and pushing the supply valve body 13 off of the supply opening 10, so that the supply chamber 9 is in fluid communication with the delivery chamber 7 and fluid pressure from the reservoir 30 can be supplied to the brake pipe (not shown). The output fluid pressure P2 is also communicated to the side of the piston 4 opposite the control chamber 2, that is, the equalization chamber 5, in order to satisfy the abovementioned equalization equation for the relay valve shown in FIG. 1.

Although the hereinabove-described embodiment of the invention constitutes a preferred form, it can be appreciated that modifications can be made thereto without departing from the scope of the invention as set forth in the appended claims.

As an example of such a modification, it might be possible to consider an increase in the force added by the return spring, and a decrease in the output air pressure by such an amount. However, the additional force applied by the return spring in the piled-up position is constant; therefore, it can equalize the output air pressure to the control air pressure only at the pressure at this one point. Compared with this, in the method of this invention, the areas on which the pressure is exerted are almost equal so that, no matter how large the control air pressure, the output air pressure can be almost equalized to the control air pressure.

Another method which might be considered would be to provide a piston which receives the control air pressure and a piston which receives the output air pressure in the piled layer as separate pieces, the areas of which could be changed to match the output air pressure to the control air pressure. However, any solution employing such a method would result in an apparatus which takes up a great deal of space, and is complicated since there is an extra piston. Costs of production and maintenance would also increase. By comparison, in the method of this invention, only the positions of the exhaust chamber has been changed and the supply-exhaust valve rod has been extended, so that there is no increase in the number of pistons, and there are none of the other disadvantages of the other method described above.

I claim:

1. A relay valve comprising:
   (a) a housing having formed therein, an equalizing chamber; a control chamber; a delivery chamber formed adjacent the upper side of said equalizing chamber and separated from said equalizing chamber by a first partition; a supply chamber formed adjacent the upper side of said elivery chamber and separated from said delivery chamber by a second partition; and an exhaust chamber formed adjacent the bottom side of said control chamber and separated from said control chamber by a third partition;
   (b) a piston member reciprocally movable within said equalizing and control chambers and moving in a first direction under the influence of a control fluid pressure selectively introduced to the underside of said piston member;
   (c) a passageway formed in said first partition such that, delivery fluid pressure introduced to said delivery chamber is communicated to said equalizing chamber and to the upper side of said piston member to affect movement of said piston member in a second direction;
   (d) a hollow rod member formed coaxially on said piston member and exending through said first and third partitions in a sliding sealed manner;
   (e) an exhaust valve disposed in said delivery chamber and formed partially by a portion of said hollow rod member such that, at times, said delivery chamber can be put in fluid communication with said exhaust chamber through said hollow rod member;
   (f) a supply valve formed between said delivery chamber and said supply chamber and being partially in contact with said hollow rod member such that, movement of said piston member affects operation of said supply valve; and
   (g) said piston member being movable as a function of a balance of such control fluid pressure acting against a first surface area associated with said underside of said piston member and of such delivery fluid pressure acting on a second surface area associated with said upper side of said piston member in which said first surface area of said underside of said piston member is substantially equal to said second surface area of said upper side of said piston member so that the delivery fluid pressure in said delivery chamber becomes substantially the same value as the control fluid pressure in said control chamber.

2. A relay valve, as set forth in claim 1, wherein said passageway is a throttled passageway.

3. A relay valve, as set forth in claim 1, wherein said exhaust valve and said supply valve are arranged in a stacked manner, with said supply valve being disposed above said exhaust valve.

4. A relay valve, as set forth in claim 3, wherein said supply valve includes a supply valve body which, in such stacked arrangement, additionally acts as a valve body with which an exhaust valve seat associated with said exhaust valve cooperates to form said exhaust valve.

5. A relay valve, as set forth in claim 1, further comprising an annular diaphragm secured to the circumference of said piston on an inner circumference, and to said housing on an outer circumference so that said piston moves in said control chamber in a flexible, sealed manner.

6. A relay valve, as set forth in claim 5, wherein said equalizing chamber is formed in said housing between said delivery chamber and said control chamber and said equalizing chamber being separated from said control chamber by said piston member and said annular diaphragm.

7. A relay valve, as set forth in claim 6, further comprising a return spring disposed in said equalizing chamber and in contact with said piston member so as to urge said piston member in such second direction.

8. A relay valve, as set forth in claim 4, further comprisiing a valve spring disposed in contact with said supply valve body such that, said supply valve body is urged onto a supply valve seat formed around a valve opening formed in said second partition.

9. A relay valve, as set forth in claim 1, wherein said first surface area of said piston on which such control fluid pressure acts, and said second surface area of said piston on which such delivery fluid pressure acts are substantially equivalent.

10. A relay valve, as set forth in claim 9, wherein said hollow rod member has an upper-extending portion of a first diameter which extends through said first partition, and a lower-extending portion of a second diameter which extends through said third partition, said first and second diameters being substantially equivalent such that said first and second surface areas of said piston, on which is exerted such control and delivery fluid pressures, respectively, are equally affected.

11. A relay valve, as set forth in claim 10, further comprising an exhaust valve seat associated with said exhaust valve, which is formed at an upper opening of said upper portion of said hollow rod member.

12. A relay valve, as set forth in claim 10, wherein said passageway is a throttled passageway.

13. A relay valve, as set forth in claim 12, wherein said exhuast valve and said supply valve are arranged in a stacked manner, with said supply valve being disposed above said exhaust valve.

14. A relay valve, as set forth in claim 13, further comprising an annular diaphragm secured to the circumference of said piston on an inner circumference, and to said housing on an outer circumference so that said piston moves in said control chamber in a flexible, sealed manner.

* * * * *

UNITED STATES PATENT AND TRADEMARK OFFICE
CERTIFICATE OF CORRECTION

PATENT NO. : 4,750,787
DATED : June 14, 1988
INVENTOR(S) : Takeshi Kishimoto

It is certified that error appears in the above-identified patent and that said Letters Patent are hereby corrected as shown below:

Column 5, line 54, delete "elivery" and insert --delivery--

Signed and Sealed this

Tenth Day of January, 1989

*Attest:*

DONALD J. QUIGG

*Attesting Officer*  *Commissioner of Patents and Trademarks*